United States Patent [19]

Corrigan

[11] Patent Number: 4,865,428
[45] Date of Patent: Sep. 12, 1989

[54] ELECTROOPTICAL DEVICE

[76] Inventor: Dennis A. Corrigan, 4042 Three Oaks #1-B, Troy, Mich. 48098

[21] Appl. No.: 87,891

[22] Filed: Aug. 21, 1987

[51] Int. Cl.[4] .............................................. G02F 1/01
[52] U.S. Cl. .................................................... 350/357
[58] Field of Search ........................................ 350/357

[56] References Cited

U.S. PATENT DOCUMENTS

| Re. 28,199 | 10/1974 | Deb et al. | 350/160 |
|---|---|---|---|
| 3,578,843 | 5/1971 | Castellion | 350/160 |
| 3,844,636 | 10/1974 | Maricle et al. | 350/160 |
| 4,277,147 | 7/1981 | Arnoldussen | 350/357 |
| 4,293,194 | 10/1981 | Takahashi | 350/357 |
| 4,309,083 | 1/1982 | Duchene et al. | 350/357 |
| 4,660,939 | 4/1987 | Tsuchiya et al. | 350/357 |

FOREIGN PATENT DOCUMENTS 0095221 8/1981 Japan .................................. 350/357

OTHER PUBLICATIONS

Zaromb, Solomon, "Geometric Requirements for Uniform Current Densities at Surface-Conductive Isulators of Resistive Electrodes", *Journal of the Electrochemical Society*, Oct. 1962, pp. 912–918.

J. Nagai, T. Kamimori and M. Mizuhashi, "Proceedings of SPIE—International Society for Optical Engineering," C. M. Lampert, ed., vol. 562, p. 39, SPIE—The International Society for Optical Engineering, Bellingham, WA, 1985.

K. L. Chopra, S. Major and D. K. Pandya, *Thin Solid Films*, 103, 1 (1983).

L. H. VanVlack, "Nickel Oxide," The International Nickel Company, Inc., 1980.

C. M. Lampert, *Solar Energy Materials*, 11,1 (1984); "Electrochromic Materials and Devices for Energy Efficient Windows".

*Primary Examiner*—Eugene R. Laroche
*Assistant Examiner*—Nathan W. McCutcheon

[57] ABSTRACT

An electrochromic device useful as a smart window comprises a pair of transparent doped tin oxide layers that serve as the terminal electrodes, and between which are sandwiched an electrochemical cell including a layer of electrochromic material and between the layer of electrochromic material and its proximate terminal is inserted a layer of tin oxide whose normal resistance is large compared to the lateral resistance of the proximate doped tin oxide layer. This serves to improve the lateral uniformity of the potential applied to the electrochemical cell when a voltage is applied across the terminal electrodes with a resultant improvement in the uniformity of coloring and bleaching across the surface of the electrochromic layer.

9 Claims, 1 Drawing Sheet

ELECTROOPTICAL DEVICE

FIELD OF THE INVENTION

This invention relates to an electrooptical device and more particularly to such a device whose light transmittance or reflecting characteristics may be controlled by an applied electrical field. Such a device is often termed an electrochromic device.

BACKGROUND OF THE INVENTION

Electrochromic devices are of increasing importance particularly in the automotive industry and the invention will be described for specific use in such industry although a wider use clearly is apparent.

In the automotive industry, electrochromic devices would be useful in the glass portions of an automotive vehicle. More particularly, an electrochromic windshield would be useful so that the transmission of light into the passenger compartment could be regulated to facilitate the heat management of such compartment. For example, it is advantageous to control the transmittance of infrared and visible radiation from the sun into the passenger compartment during the heat of the day to reduce the load on the air conditioning requirement. Similarly, it would be desirable to reduce the transmittance of visible light through the side windows of an automobile to permit privacy to its interior when desired. As a consequence, the automotive industry is showing considerable interest in so-called "smart windows" through which light transmittance can be controlled either manually or automatically.

Additionally, there also are electrochromic applications, such as for a rear-view mirror of an automotive vehicle, in which it would be desirable to change its reflectance automatically in response to photoelectric sensing of approaching headlights, to reduce the glare on the driver of the vehicle.

Electrochromic devices typically involve a rigid passive substrate that provides structural support, such as a layer of glass, for the active portion which comprises a multilayer sandwich of elements. Generally, the two outer layers of the active portion serve as the two terminal electrodes for the electronic current of the device. Between these terminal electrodes are sandwiched an electrochemical cell which generally comprises in succession a layer of an electrochromic material, a layer of an electrolyte, either solid or liquid, and a counter electrode. When a dc voltage is applied across the two terminal electrodes, electrons are either injected in or ejected out of the electrochromic layer at its interface with the terminal electrode while suitable ions are injected into or ejected from the electrochromic layer at its electrolyte interface. The electrolyte must conduct the ions participating in the electrochemical reaction that causes the color change. The counter electrode must be reversible to the same ions since it must allow the color changing reaction to proceed in the reverse direction so that the electrochromic layer may be also uncolored or "bleached" when desired. The counter electrode may also store the ions involved in the coloration reaction. In some instances, the counter electrode may also serve as one of the two terminal electrodes. For most applications, the electrolyte, the counter electrode and the two terminal electrodes need to be transparent.

The depth of color change and the resulting transmittance change in the electrochromic layer depend on the amount of ionic charge injected into or ejected from the electrochromic layer. In one sense, an electrochromic cell is basically a battery with a visible state of charge.

A wide variety of materials are known to be useful for coloring in the manner described and include some which can be colored cathodically in an electrochemical cell, such as tungstic oxide ($WO_3$) and molybdenum oxide ($MoO_3$), and others which can be colored anodically in an electrochemical cell, such as iridium oxide.

Similarly, a wide range of materials have been proposed, both liquid and solid, for use as the electrolyte. Superionic conductors and polymeric ion conductors are available in solid form.

Typically, the terminal electrodes are of transparent tin oxide doped to be highly conductive.

When an electrochromic device of the kind described has been used as the window of an automobile, the window is often subject to non-uniform coloration (darkening) and bleaching (lightening) as its transmission is varied. Such non-uniformity is undesirable and the present invention provides a solution to this problem.

SUMMARY OF THE INVENTION

I have found that this nonuniformity in many cases results from the nonuniformity in the effective potential acting on the electrochemical cell. In particular, the effective potential has a lateral variation because of the voltage drop resulting from the lateral resistance of the terminal electrodes. The present invention is based on making more uniform the potential acting on the electrochemical cell.

To this end, in accordance with the present invention, there is included in the electronic part of the circuit between the two terminal electrode layers an auxiliary electronically conducting layer of a material such that the resistance normal to the surface of this layer effectively dominates the lateral variation in the resistance of the terminal electrode layers. This normal resistance may either result from the resistance of the material in the bulk of the auxiliary layer or may result from the contact resistance introduced by the barrier between the auxiliary layer and the contiguous terminal electrode layer. As a result of the inclusion of this auxiliary electrode layer, the potential over the entire surface of the electrochemical cell is made more uniform because the degree of lateral variation of the voltage drop in the terminal electrode layer is reduced. The resistivity of this layer however should not be so high that excessively high voltages need to be applied to the terminal electrodes to achieve the electrochromic effect.

BRIEF DESCRIPTION OF THE DRAWINGS

The invention will be better understood from the following more detailed description taken in conjunction with the accompanying drawings in which.

DETAILED DESCRIPTION

Figure 1:
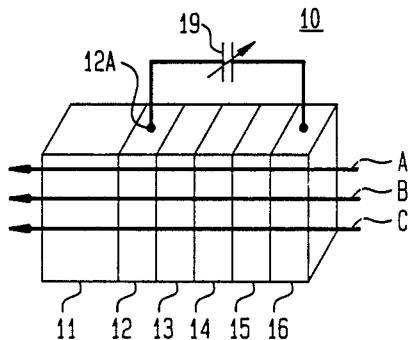
FIG. 1 illustrates schematically a cross-section of an electrochromic device typical of the prior art.

A prior art electrochromic device 10 shown in FIG. 1 includes the planar glass substrate 11 which provides structural support and ruggedness to the device but is otherwise passive. Supported on this substrate is a stack of coatings or layers 12 through 16, of which layers 12 and 16 are the terminal electrode layers. Across these terminal layers, there is established a voltage supplied by a dc source 19 which may be varied, either manually or electronically. Generally, these terminal layers are of tin oxide ($SnO_2$) doped to increase its electrical conductivity. Such layers can be highly light-transmissive. A typical thickness for each of these layers is about 100 nanometers.

The intermediate layers 13, 14 and 15 basically form a spectroelectrochemical cell or thin-film battery whose color is dependent on its state of charge; to color or to bleach the cell requires only the charge or discharge of its electrochromic film. In this cell, layer 13 is of the electrochromic material, layer 14 is of an ionic conductor and layer 15 is the counter electrode, that may also be electrochromic. For example, layer 13 may be of hydrous nickel oxide $Ni(OH)_2 \cdot xH_2O$ and of a thickness of about 50 nanometers. The layer 15 that serves as the counter electrode typically may be a layer of a material such as manganese hydroxide which is both an ionic and an electronic conductor, of thickness comparable to that of layer 15. The electrolytic layer 14 may be of 1M potassium hydroxide, typically 100 micrometers thick.

The coloration reaction in a gross sense is similar to the anodic charging reaction in nickel oxide battery electrodes where divalent nickel oxide is oxidized to form a more colored trivalent nickel oxide. Bleaching occurs when the reaction is reversed. The change in coloration tends to be continuous with change in the potential of the cell.

Figure 2:
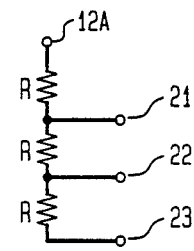
FIG. 2 shows schematically a diagram of the equivalent resistance circuit of the device of FIG. 1.

FIG. 2 is an equivalent circuit schematic which illustrates the resistance experienced in the terminal electrode layer 12 to reach its electric contact 12A by the electron current (as distinguished from the ionic current in the cell portion) that is associated with the paths of three different light rays, A, B and C shown in FIG. 1. Each is through regions of the terminal electrode layer 12 successively further displaced by a unit length from the edge of the layer 12 where the voltage is being applied. The resistance R in FIG. 2 is the resistance per unit length in the lateral direction parallel to the plane of the layer. A similar situation exists at the other terminal electrode 16. It is evident that at node 21, corresponding to the point of entry of ray A into layer 12, the voltage drop from the electrical contact 12A, will be less than at nodes 22 and 23, corresponding to the points of entry of rays B and C into layer 12. This means that the voltage at node 21 will be higher than at nodes 22 and 23 so that the electrochemical cell formed by layer 13, 14 and 15 will experience a higher applied potential at the point corresponding to node 21 than it will at points corresponding to nodes 22 and 23, resulting in a different amount of colorization at the point corresponding to node 21. Similar considerations result in a different degree of coloring at the point corresponding to node 22 than at the point corresponding to the node 23. If a low resistance metal layer is deposited over all the edges of the terminal layer 12 for use as the connection to a lead from the voltage supply, electrical contact 12A essentially corresponds to the edge nearest the point being considered.

One solution to this problem would be to increase the lateral conductivity of the layer 12, as could be done by increasing the thickness of the layer, since its conductivity will increase with thickness. However a trade-off with the transparency of this layer eventually needs to be made. With materials presently available for use as the layer 12, a limit in thickness for adequate transparency is reached before this non-uniformity problem is solved for electrochromic windows of size needed for automobile use.

Figure 3:
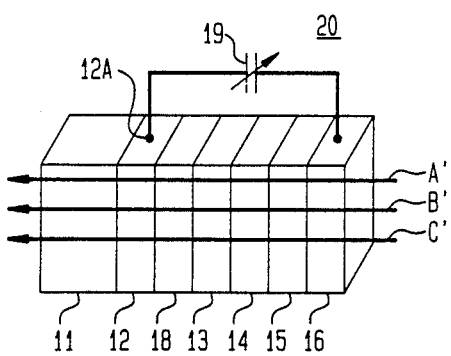
FIG. 3 illustrates in the manner of FIG. 1 an electrochromic device in accordance with an embodiment of the invention.

Referring now to FIG. 3, there is shown an electrochromic device 20 in accordance with the present invention. Device 20 lessens the dependence of the effective potential on a particular point of the electrochromic layer 13 on its distance from the electrical contact 12A of the layer 12 where the full voltage is being applied, through the use of an added transparent auxiliary layer 18 between the terminal layer 12 and the electrochromic layer 13. The reference numerals used in FIG. 1 are carried over to FIG. 3 for corresponding elements.

Figure 4:
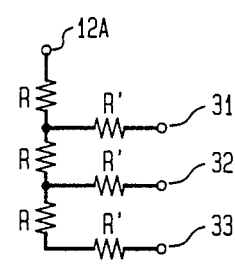
FIG. 4 similarly shows schematically the equivalent resistance circuit of the embodiment of FIG. 4.

This auxiliary layer 18 is chosen to have a resistance in the direction normal to the plane of the layer which is high relative to its resistance in the plane of the layer. The equivalent schematic circuit for electrons along paths in the terminal electrode layer 12 and auxiliary layer 18 corresponding to light rays A, B and C is depicted in FIG. 4 in the manner described in connection with FIG. 2. In this case, the resistance normal to the surface per unit area through this auxiliary layer 18 is R'. If the value R' is sufficiently higher than R, it is evident from the equivalent circuit depicted, that the percentage variation in total series resistance from either of the nodes 31, 32 and 33 to node contact 12A will be less than the percentage variation in series resistance from either of nodes 21, 22 and 23 to node 24. In particular, if R' is much larger, for example by a factor of ten, than R, the resistance in each of the three paths depicted in FIG. 4 will remain approximately equal to R' whereas for the three paths depicted in FIG. 2, the resistances will be R, 2R and 3R, respectively.

It can be appreciated that the R' resistance will be the sum both of the bulk normal resistance of the auxiliary layer and of the contact resistance between the auxiliary layer and the contiguous terminal electrode layer. In particular, it appears that relatively high conductivity nickel oxide can be used as the auxiliary layer because of the relatively high contact resistance it forms with a terminal electrode layer of fluorine-doped tin oxide.

The inclusion of the transparent auxiliary terminal layer 18 will necessitate a higher applied voltage to compensate for the voltage drop added by such inclusion. However, this is not a serious disadvantage because the power dissipation by the electrochromic voltages will remain low. However, to avoid the need for an unnecessarily high applied voltage, R' advantageously is larger than R by a factor of ten to twenty.

As was previously mentioned, the problem of lateral voltage drop in a terminal electrode exists at each of the two terminal electrodes. It is sufficient to include only one auxiliary layer to solve the problem at both terminal electrodes if its normal resistance is sufficiently high. Typically if the two terminal electrodes are of the same kind, a single auxiliary layer with a normal resistance per unit area of about twenty times the lateral resistance per unit length of each terminal layer should be sufficient for high uniformity with convenient voltage levels.

It should be apparent that the auxiliary layer may be added anywhere in the path of the electron current as distinguished from the path of ionic current. Accordingly, the auxiliary layer may alternatively have been inserted between the counter electrode layer 15 and the terminal electrode layer 16 although this normally would be an inferior location. In some instances it may by preferable to add separate auxiliary layers at opposite ends, e.g. one between layers 12 and 13 and one between layers 15 and 16 to distribute the desired normal resistance between them.

At the present date, the best transparent conductor available for use as a terminal electrode layer is fluorine-doped tin oxide (FTO). If the layer 12 consists of an FTO coating with a resistance of 10 ohms per square, an added layer of a thickness to add a normal resistance of 100 ohms to a one square centimeter area might comprise a thickness of 10 micrometers of a material having a resistivity of $1 \times 10^5$ ohms-centimeter.

The design of a two layer coating will depend on the area of the coating. The lateral or parallel resistance of the terminal or underlayer 12 will remain constant as the area is increased provided the geometry remains the same, i.e., the two lateral dimensions are being increased by the same factor. However the normal resistance of the auxiliary overlayer 18 will decrease proportionally with area. Thus, the product of the overlayer resistivity and its thickness must increase proportionally with area to maintain the desired ratio of parallel to normal resistance. For example, a 5000 centimeter square area, the typical size of an automobile window, requires a resistivity film thickness product 5000 times that in the one centimeter square example discussed above. As is known, the resistivity of tin oxide can be controlled by its doping. A film of suitable resistivity is achievable by tin oxide with little or no doping.

Accordingly, in a presently preferred embodiment of the invention, each of layers 12 and 18 will be of tin oxide with the former doped with fluorine to be highly conductive while the latter would be essentially undoped to be several orders of magnitude less conductive. Each of these layers can be readily prepared by metallo-organic deposition.

In instances where higher normal resistivities than realizable with undoped tin oxide are needed, tantalum oxide or titanium oxide may be used instead.

It should be recognized that the invention is broadly applicable to electrochromic devices of the general kind discussed in which the lateral resistance of the terminal electrodes result in a lateral voltage drop that results in nonuniformity of the effective potential on the electrochemical cell portion of the device with resulting non-uniform coloring and bleaching. Accordingly, the invention is not limited to the specific set of materials used in the illustrative embodiment described.

It should be appreciated that various arrangements can be used to control the transmittance of the electrochromic device. For example, provision can be made to adjust the voltage supplied by the source manually, as when a desired level of privacy is desired within the interior of an automobile provided with electrochromic windows. Alternatively, sensors can be used to adjust the voltage supplied automatically in response to environmental conditions, such as the amount of sunlight incident an an electrochromic windshield. Additionally, for use as a reflecting near-view mirror, a reflective coating would be deposited over one of the terminal electrode layers.

The embodiments of the invention in which an exclusive property or privilege is claimed are defined as follows:

1. A broad area type of electrochromic device for regulating transmission of radiation, which device includes a transparent substrate, a pair of blanket terminal electrode layers on the substrate, and means forming an electrochemical cell included between the blanket terminal electrode layers including at least one layer of an electrochromic material, characterized in that a highly resistive blanket auxiliary layer is included between the electrochemical cell and at least one of said blanket terminal electrode layers, said highly resistive blanket auxiliary layer having an electrical resistance normal to its thickness of at least about ten times greater than the electrical resistance of its contiguous terminal electrode layer parallel to its thickness, for substantially reducing the lateral variations in potential applied to the cell and an attendant lateral color variation in said device when a voltage is applied across the two blanket terminal electrode layers.

2. The electrochromic device of claim 1 in which the auxiliary blanket layer is of a material which forms a contact resistance with its contiguous blanket terminal electrode layer which is large compared to the lateral resistance of the blanket terminal electrode layers.

3. The electrochromic device of claim 1 in which a highly resistive blanket auxiliary layer is disposed between the electrochemical cell and each of the two blanket terminal electrode layers.

4. The electrochromic device of claim 3 in which the auxiliary layer is of nickel oxide and the layer of electrochromic material is of nickel hydroxide.

5. The electrochromic device of claim 1 in which the electrochemical cell comprises a layer of nickel hydroxide, a layer of potassium hydroxide, and a layer of manganese hydroxide.

6. The electrochromic device of claim 3 in which the electrochemical cell comprises a layer of nickel hydroxide, a layer of potassium hydroxide and a layer of manganese hydroxide.

7. The broad area electrochromic device of claim 1 in which the transparent substrate is a window of at least about 5,000 square centimeters in area.

8. The electrochromic device of claim 1 in which the electrochromic device is an automobile window.

9. The electrochromic device of claim 1 in which the electrochromic device is a part of an automobile rear view mirror.

* * * * *

UNITED STATES PATENT AND TRADEMARK OFFICE
CERTIFICATE OF CORRECTION

PATENT NO. : 4,865,428

DATED : September 12, 1989

INVENTOR(S) : Dennis A. Corrigan

It is certified that error appears in the above-identified patent and that said Letters Patent is hereby corrected as shown below:

Title page, column 1, insert heading -- Assignee: General Motors Corporation, Detroit, Mich. --;

Title page, column 2, before item [57], insert --Attorney, Agent, or Firm Robert J. Wallace --.

Signed and Sealed this

Fifth Day of February, 1991

*Attest:*

HARRY F. MANBECK, JR.

*Attesting Officer*     *Commissioner of Patents and Trademarks*